(12) United States Patent
Jason

(10) Patent No.: US 9,378,240 B2
(45) Date of Patent: *Jun. 28, 2016

(54) SYSTEMS AND METHODS FOR HOT TOPIC IDENTIFICATION AND METADATA

(71) Applicant: Christopher Jason, Burbank, CA (US)

(72) Inventor: Christopher Jason, Burbank, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/322,344

(22) Filed: Jul. 2, 2014

(65) Prior Publication Data

US 2015/0149494 A1 May 28, 2015

Related U.S. Application Data

(63) Continuation of application No. 13/093,263, filed on Apr. 25, 2011, now Pat. No. 8,775,431.

(51) Int. Cl.
*G06F 17/30* (2006.01)
*G06Q 30/02* (2012.01)
*G06Q 50/00* (2012.01)

(52) U.S. Cl.
CPC ...... *G06F 17/30386* (2013.01); *G06F 17/3061* (2013.01); *G06Q 30/02* (2013.01); *G06Q 50/01* (2013.01)

(58) Field of Classification Search
CPC .......... G06F 17/30386; G06F 17/3061; G06Q 30/02; G06Q 50/01
USPC ........................................................ 707/740
See application file for complete search history.

(56) References Cited

U.S. PATENT DOCUMENTS

| | | | | |
|---|---|---|---|---|
| 8,060,366 | B1* | 11/2011 | Maganti | ................ H04L 65/403 370/260 |
| 2003/0033333 | A1* | 2/2003 | Nishino | ............ G06F 17/30884 715/255 |
| 2004/0260621 | A1* | 12/2004 | Foster | ................... G06Q 30/02 705/26.62 |
| 2007/0094247 | A1* | 4/2007 | Chowdhury | ...... G06F 17/30864 |

(Continued)

FOREIGN PATENT DOCUMENTS

CN 101923544 B * 8/2012

OTHER PUBLICATIONS

Chen et al., "Hot Topic Extraction Based on Timeline Analysis and Multidimensional Sentence Modeling", IEEE Transactions on Knowledge and Data Engineering, vol. 19, No. 8, Aug. 2007, pp. 1016-1025.*

(Continued)

*Primary Examiner* — Phuong Thao Cao
(74) *Attorney, Agent, or Firm* — McCormick, Paulding & Huber LLP

(57) ABSTRACT

According to some embodiments, systems, apparatus, methods and computer program code are provided for receiving data from a plurality of remote data sources, the received data being associated with a plurality of search terms, analyzing the received data to identify at least a first trending search term, comparing the trending search term with a database of topical terms to determine whether the trending search term is relevant to a predetermined topic, querying a content database using the trending search term to identify a caption to be associated with the trending search term, and storing the trending search term and the caption in a database.

23 Claims, 8 Drawing Sheets

(56) References Cited

U.S. PATENT DOCUMENTS

| | | | | |
|---|---|---|---|---|
| 2007/0143300 | A1* | 6/2007 | Gulli | G06F 17/30551 |
| 2008/0026830 | A1* | 1/2008 | Laut | G06Q 30/00 463/25 |
| 2008/0082499 | A1* | 4/2008 | Koski | G06F 17/30719 |
| 2008/0256444 | A1* | 10/2008 | Wang | G06F 17/30864 715/700 |
| 2009/0006311 | A1* | 1/2009 | Ting | G06F 17/30864 |
| 2009/0070128 | A1* | 3/2009 | McCauley | G06F 21/604 705/300 |
| 2009/0070426 | A1* | 3/2009 | McCauley | G06Q 10/10 709/205 |
| 2009/0234811 | A1* | 9/2009 | Jamil | G06F 17/30867 |
| 2010/0082649 | A1* | 4/2010 | Gutt | G06F 17/30864 707/758 |
| 2010/0088322 | A1* | 4/2010 | Chowdhury | G06F 17/30864 707/751 |
| 2010/0100537 | A1* | 4/2010 | Druzgalski | G06Q 30/02 707/713 |
| 2010/0169492 | A1* | 7/2010 | Lee | G06Q 30/02 709/226 |
| 2010/0293185 | A1* | 11/2010 | Rosado | G06F 17/3089 707/769 |
| 2011/0041076 | A1* | 2/2011 | Sinn | G06Q 30/02 715/745 |
| 2011/0184936 | A1* | 7/2011 | Lymberopoulos | G06F 17/30902 707/721 |
| 2011/0238413 | A1* | 9/2011 | Wu | G06F 17/2745 704/10 |
| 2011/0258017 | A1* | 10/2011 | Koppula | G06Q 30/0201 705/7.29 |
| 2011/0282732 | A1* | 11/2011 | Bax | G06Q 30/0245 705/14.44 |
| 2011/0289088 | A1* | 11/2011 | Yarin | G06F 17/30864 707/738 |
| 2011/0289433 | A1* | 11/2011 | Whalin | G06F 17/30964 715/753 |
| 2012/0004959 | A1* | 1/2012 | Benyamin | G06Q 30/0241 705/14.4 |
| 2012/0005224 | A1* | 1/2012 | Ahrens | G06Q 10/10 707/769 |
| 2012/0019446 | A1* | 1/2012 | Wu | G06F 3/018 345/168 |
| 2012/0030018 | A1* | 2/2012 | Passmore | G06F 17/30702 705/14.52 |
| 2012/0166438 | A1* | 6/2012 | Wu | G06F 17/3064 707/737 |
| 2012/0203706 | A1* | 8/2012 | Teran | G06Q 50/01 705/319 |
| 2012/0271829 | A1* | 10/2012 | Jason | G06F 17/3061 707/740 |
| 2012/0272160 | A1* | 10/2012 | Spivack | G06Q 10/10 715/752 |
| 2015/0120773 | A1* | 4/2015 | Finkelstein | G06F 17/3097 707/767 |

OTHER PUBLICATIONS

Sherk A., "Free Tools for Monitoring Hot Search Trends", Oct. 1, 2009, 7 pages, accessed online at <http://www.adamsherk.com/seo/search-trend-tracking-tools/> on Sep. 3, 2015.*

Li et al., "Netnews Bursty Hot Topic Detection Based on Bursty Features", In Proceedings of the 2010 International Conference on E-Business and E-Government, IEEE, pp. 1437-1440, 2010.*

* cited by examiner

| TRENDING TOPIC 502 | SITE CAPTION 504 | MATCHING STORY 506 |
|---|---|---|
| Johnny Damon | The Red Sox would have liked to add Johnny Damon, but they'll carry on. | http://sports.espn.go.com/boston/mlb/columns/story?columnist=mcdonald_joe&id=5494757 |
| New York Mets | Jerry Manuel has pinned the Mets' turnaround hopes on … Jeff Francoeur? | http://sports.espn.go.com/new-york/mlb/news/story?id=5495067 |
| Philadelphia Phillies | The Houston Astros wild 4-2 win over Philadelphia lasted 16 innings, over 5 hours, and saw Phillies pitcher Roy Oswalt play left field and ground into the final out Tuesday night. | http://sports.espn.go.com/mlb/recap?gameId=300824122 |

FIG. 5

SYSTEMS AND METHODS FOR HOT TOPIC IDENTIFICATION AND METADATA

BACKGROUND

In the past, publishers of content and news decided what content to produce and what topics to write about. Consumers of content opted in to receive specific types of content by subscribing to specific publications or sources. For example, football fans eagerly awaited the Monday morning paper to read the box scores and recaps of how their favorite team fared the previous day. The Internet has changed that model, as readers and consumers of news and information now expect to be able to find the information they wish to consume, when they want it.

Social media platforms, blogs and other online publications allow news and information to spread rapidly. Consumers of content expect to find information instantly—almost in real time. Consumers are less reliant on a single source of information. Now, instead of waiting for the newspaper to arrive, consumers seek out information from whatever source has it. Football fans don't wait for the Monday morning paper to check the box scores. This change in how information is shared and consumed makes it more difficult for producers of content to quickly identify and publish relevant information that consumers want to read. It also makes it more difficult to retain consumers, as consumers go to the sources that have the information they want instead of sticking with a single source.

Many content producers manually monitor trending topics (using tools such as Google's "Google Trends", or the like) and search for information that is gaining in popularity. An editor or journalist may monitor this information and then use the trend information to identify topics that should be the subject of a story or article. Unfortunately, this process of monitoring and identifying trending topics is manual, time consuming and not consistent. A publisher that doesn't react quickly and produce relevant and timely content is going to lose readers.

The problem is made more difficult by the sheer volume of news and newsworthy information available via the Internet. Moreover, there are many different types of information sources that may be of interest. As a result, monitoring, tracking and mining this data can be a time consuming, expensive, error-prone, and difficult task. In addition, the results of such monitoring can include a confusing amount and array of information that can be difficult to comprehend, analyze, evaluate, correlate and/or act upon.

SUMMARY

According to some embodiments, systems, apparatus, methods and computer program code are provided for receiving data from a plurality of remote data sources, the received data being associated with a plurality of search terms, analyzing the received data to identify at least a first trending search term, comparing the at least first trending search term with a database of topical terms to determine that the at least first trending search term is relevant to a predetermined topic, querying a content database using the at least first trending search term to identify a caption to be associated with the at least first trending search term, and storing the at least first trending search term and the caption in a database.

A technical effect of some embodiments of the invention is an improved and automated ability to identify trending topics and provide context to those trending topics. In some embodiments, the identified topics and context may be used to identify topics to produce additional or new content. With this and other advantages and features that will become hereinafter apparent, a more complete understanding of the nature of the invention can be obtained by referring to the following detailed description and to the drawings appended hereto.

BRIEF DESCRIPTION OF THE DRAWINGS

FIG. 5 is a tabular view of a portion of a trending topic database in accordance with some embodiments of the present invention.

DETAILED DESCRIPTION

Figure 1:
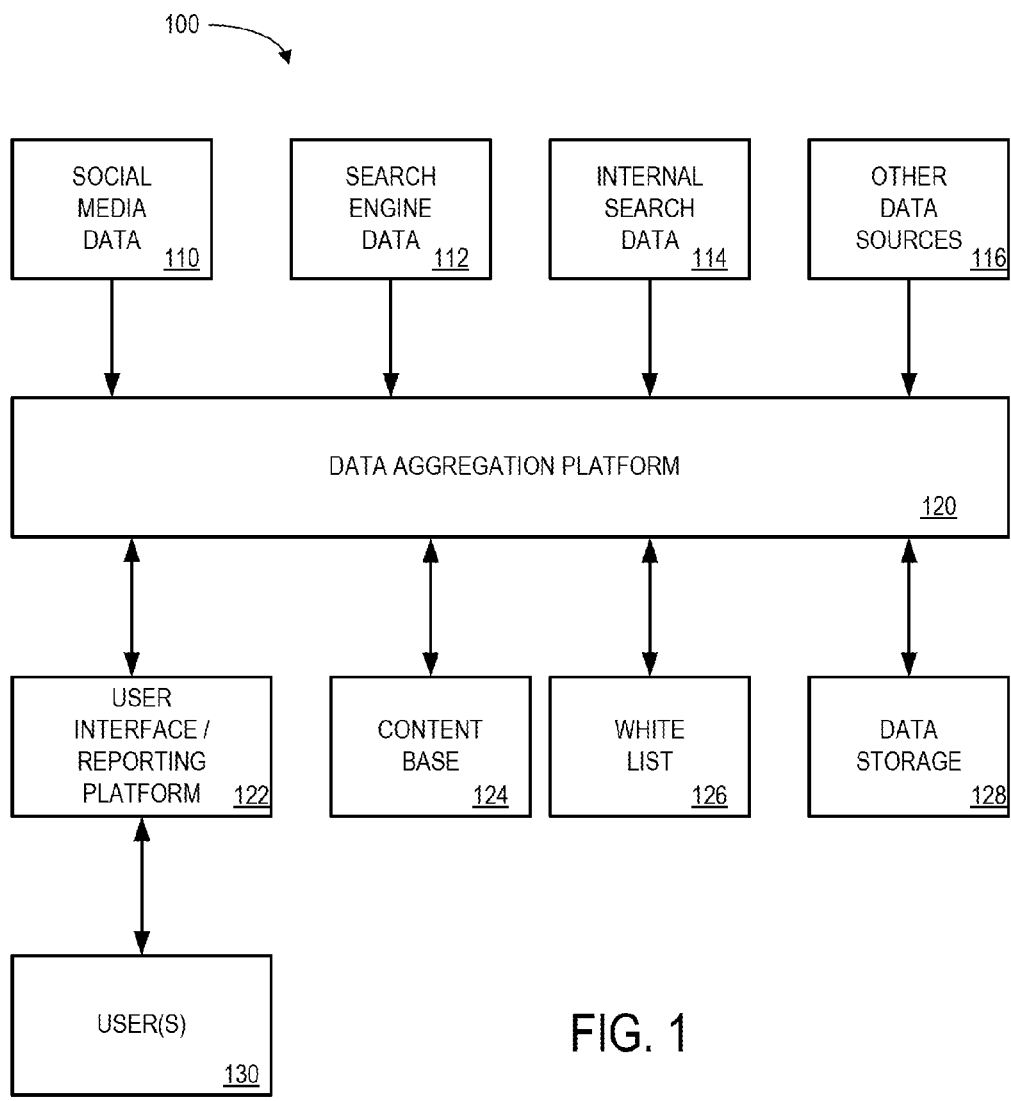
FIG. 1 is a block level diagram of a system according to some embodiments.

It is desirable to automatically monitor a wide variety of information sources to identify "hot topics" or topics of interest. It is further desirable to identify hot topics in specific areas of interest (e.g, such as topics related to sports, or financial news, etc.) as well as to append or associate related context to those hot topics.

Embodiments of the present invention may be used to monitor information data sources, including search engines, Websites, blogs, news feeds, social media sites, or the like. As used herein, the term "social media" may refer to any web site, web application, online data repository, or online media outlet wherein members of the public share and/or exchange information with other people. By way of examples only, social media data sources might include social networking sites, MySpace®, Facebook®, Twitter®, personal and organizational blogs, YouTube®, and other public online collaborative media. The term "search engines" may refer to any web site, web application, or online data repository which collects, aggregates, and categorizes search data across one or more Websites. For example, a search engine may include those provided by Google®, Bing®, Ask.com® or the like. Search engine data may be or include data from data sources such as Google's "Google Trends®".

To address some of the problems faced by content publishers and creators, a data aggregation application and/or apparatus may be provided. By way of introduction, in some embodiments, the data aggregation application and/or apparatus (referred to herein as a data aggregation platform 120) operates to parse data from a variety of data sources, including search engine data, social network data, internal search data, or the like, to identify "hot topics" or information associated with search queries or terms which are occurring with a greater frequency than normal. The parsed data associated with the hot topics may include the search queries or terms, as well as information identifying a source of data (e.g., such as a URL or other identifier of source or location). The parsed data, in some embodiments, is compared to a "white list" or database of acceptable terms to ensure that relevant topics are identified. As used herein, the term "white list" generally refers to a list or register of terms that have been identified as being relevant to a particular topic of interest. The white list of terms may vary from publisher to publisher. For example, a sports publication using the system of the present invention might use a white list of data related to sporting events, sporting figures, and sporting topics, while a fashion publication might use a white list of data related to fashion, style and fashion-related topics.

The parsed data (either pre- or post-white listing) may be stored in a relational or other database for further use, including use by content producers, editors, and publishers, to identify topics of interest that should be written about. The data may be appended with additional data, including a caption and resource link, allowing writers, editors and publishers to easily flesh out stories and content. In some embodiments, the hot topic information may be delivered to specific writers, editors or publishers in a variety of ways, including in emails, through a Web interface, or the like. The result is a system and method which allows content producers to not only identify topics of interest, but also to create content that has context and relevance. As used herein, the term "content" refers to both written and other content (including, for example, videos, podcasts, graphics, or the like).

Details of some embodiments of the present invention will now be provided by reference to FIG. 1, which is a block diagram of a system 100. Some or all of the components of system 100 may be operated by or on behalf of a content publisher to allow the content publisher to identify hot topics relevant to their publication and audience, and to manage the creation of content associated with those topics. In particular, a data aggregation tool or platform 120 may receive data or information from a number of remote or local data sources 110, 112, 114 and 116 (including, for example, data associated with social networking sites, search engines, internal search data and other data sources), and operate on the data to identify trending information of potential interest, compare the trending information to white list data 126 to remove non-relevant terms, append caption or other meta data to the trending information, and store the trending information and meta data in a data store 128 for use by one or more users operating user devices 130.

As used herein, the trending data or information may be referred to as "search terms" or "trending terms". Topics that are rising in search frequency, citations, or use, may be referred to herein as "hot topics". For example, the aggregation platform 120 may be used to identify those terms or topics that are being searched for, written about, or commented on with a greater frequency or velocity than usual. In a typical Internet search, a user may enter a search term into a search bar of a search engine. The search engine may track and publish information associated with the frequency with which those terms are being searched (or, in the case of Google's "Google Trends", information may be published identifying which terms are trending upward in the number of searches). Such search engine data 112 may be provided to the aggregation platform 120 via an application programming interface ("API") or feed from the search engine. In some embodiments, multiple sources of search engine data 112 may be used. For example, search engine data 112 may be retrieved from Google, Bing, and Yahoo or the like.

Figure 3A:
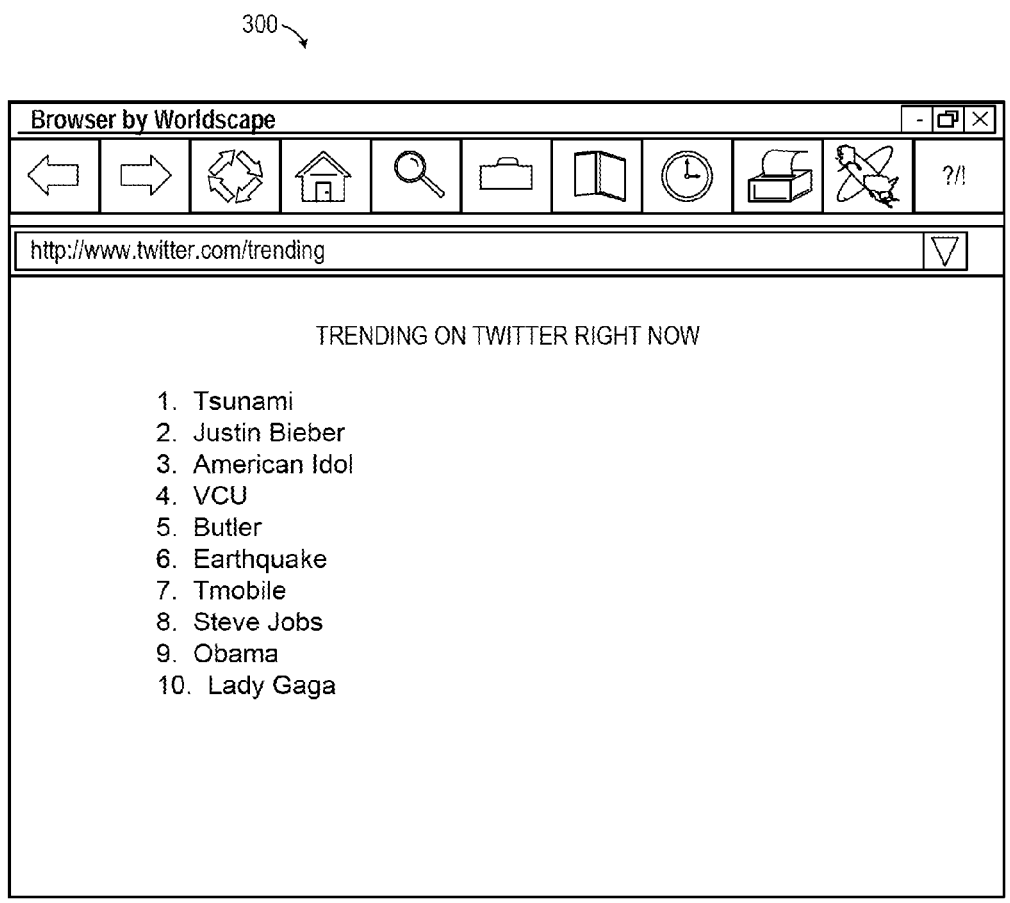
FIGS. 3A, 3B, and 3C illustrate examples of trending data and reporting data according to some embodiments.

Social media data 110 may be provided to the aggregation platform 120 via one or more APIs or feeds from one or more social media platforms or aggregators of social media data. For example, social media data 110 may include information identifying trending terms or topics from Twitter via the Twitter API or a third party analysis of Twitter data. An illustrative display of data depicting hot topics identified on a social media site are shown in the user interface of FIG. 3A. In the user interface 300 of FIG. 3A, sample trending data from Twitter is shown. As shown, a number of trending or hot topics are shown, representing terms that are being used at a particular point in time with a high frequency on the Twitter.com social media platform. The data shown in the user interface 300 may be similar to data that is provided to the data aggregation platform 120 via a social media data 110 interface (although the data provided to the data aggregation platform is more likely provided in a structured format via an API). As shown, a number of terms are trending on Twitter at a particular point in time. Only several of those terms are relevant to a sports news publication (e.g., such as the terms "TCU" and "Butler"), while other terms relate to pop culture or current events. As will be described further below, embodiments of the present invention use a white list to identify terms that are relevant to a particular publication or topic area.

Pursuant to some embodiments, the aggregation platform 120 may also receive or otherwise process data from one or more internal data sources such as internal search data 114 from searches and queries identified from users interacting with one or more Websites owned or operated by an entity operating or otherwise using the data aggregation platform 120. For example, in the situation where data aggregation platform 120 is operated by a news organization to assist in identifying and selecting topics of interest, internal search data 114 from actual search queries experienced by the news organization may be used as an input to the data aggregation platform 120. The internal search data 114 may be obtained from analytics programs or database programs which capture or log actual query data resulting from user interaction with the news organization's web properties. While this data is referred to herein as "internal", those skilled in the art will appreciate that the data may be stored elsewhere, and may in fact be "external" to the Websites owned or operated by the publisher. The term "internal" is used to suggest that the data is data controlled by or more easily accessible to the organization.

Figure 3B:
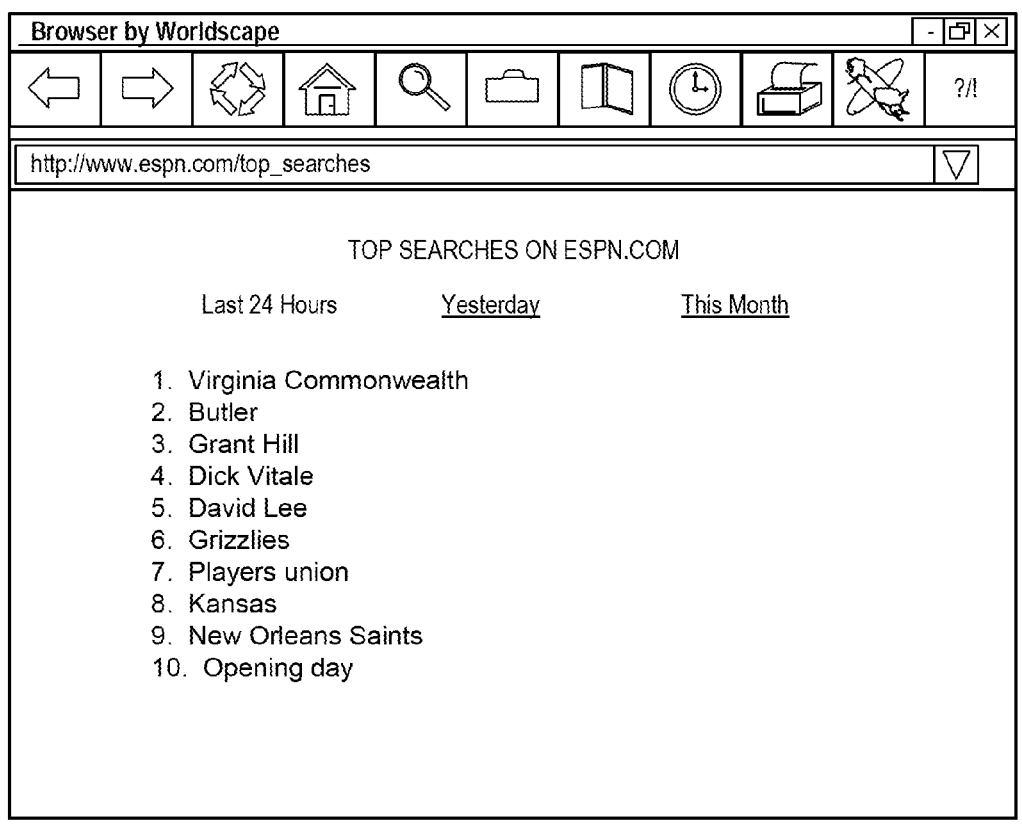

An illustrative display of data depicting hot topics identified based on such internal search data is shown in the user interface of FIG. 3B. In the user interface 310 of FIG. 3B, sample trending data from a particular publisher's web properties are shown. The trending data may be identified based on actual search data experienced at or by the web property. The trending data may change on a regular basis, and reflects the type of information that users of the web property are actually interested in. The data may be provided to the data aggregation platform 120 in a structured format (e.g., via an API, feed, or the like).

Referring again to FIG. 1, in some embodiments, other data sources 116 may also be used to provide data aggregation platform 120 with accurate and up to date data and trending topics. For example, in some embodiments data may be obtained from data aggregation services which attempt to estimate trends or search data such as, for example, services such as Compete® or the like.

The data aggregation platform 120 collects and analyzes the data received from the various data sources 110-116 in order to identify "hot topics" or trending terms or topics. The data aggregation platform 120 may be a server or network of servers or other computing devices which are configured to receive and process data as described herein. In some embodiments, data aggregation platform 120, upon receiving data from data sources 110-116, parses the data for further processing (e.g., such as pursuant to the process of FIG. 2, described further below). The data aggregation platform 120 may be capable of parsing data in any of a number of different formats, including, for example, data received as XML, text, HTML, or other formats, and the data may be received from sources storing or providing the data in structured or unstructured formats, such as a relational database, NOSQL, XML, JSON, SQL, plain text files, or the like.

The data aggregation platform 120 may store some or all of the data received from data sources 110-116 in a database such as data storage device 128. The data may be stored in a structured or unstructured format, such as a relational database, NOSQL, XML, JSON, SQL, plain text files, or the like. In general, the data may be stored in any of a number of ways which allows storage, capture or use by users or other applications. For example, the data may be stored in system memory for use by other applications.

In some embodiments, the hot topic data which results from the application of one or more white lists 126 may also be stored in a database such as the data storage device 128. An illustrated portion of such a database will be described further below in conjunction with FIG. 5. Further, in some embodiments, additional data providing context to such hot topics may also be identified (e.g., from content base 124) and associated with hot topic data. For example, a story title, an excerpt or description, or the like may be retrieved from a content base 124 (which may store a library or database of articles, stories or other content). In this manner, embodiments allow a publisher or other entity to provide context to hot topics or other trending terms allowing writers, editors or other publishing staff to accurately and readily understand the context of a particular hot topic. For example, if a hot topic is the term "Johnny Damon", the current context (or the story associated with why the term is currently "hot") may be identified using data from the content base 124. The reason why the term is hot today may be different than why the term was hot yesterday or some other day. An illustrated portion of such a database will be described further below in conjunction with FIG. 6. Those skilled in the art will appreciate that other combinations and types of data may be extracted from, created or otherwise provided using features of the present invention.

The data aggregation platform 120 may also exchange or present data to one or more remote user devices 130. As used herein, a device may be "remote" from the data aggregation platform 120 in that it is physically located distant from the data aggregation platform 120 and/or in that it communicates with the data aggregation platform 120 via one or more Internet and/or intranet communication networks and/or protocols. The data aggregation platform 120, data sources (including social media data sources 110, search engine data sources 112, internal search data sources 114, and other data sources 116), user device 130, and other components may then operate in accordance with any of the embodiments described herein. Pursuant to some embodiments, the data aggregation platform 120 provides data and information to users operating user devices 130 through a user interface/reporting platform 122 which may, for example, provide user permission and access controls to a variety of different users having different access privileges or permissions. For example, a writer may be given different access privileges than an editor, allowing different content and information to be presented to users having different functions or responsibilities.

User interface/reporting platform 122 may also include a messaging component which allows the transmission of messages, alerts or other information to users (such as, for example, writers, editors, publishers or the like). For example, the platform 122 may be configured to transmit instructions to certain classes of users (such as writers responsible for a specific topical area) alerting the users of trending terms or content that requires their attention. Such alerts and messages may be transmitted to users operating user devices 130 in a wide variety of forms, including, for example, through email, Short Message Service ("SMS") text, Multimedia Messaging Services (MMS), instant messaging, blog posts, Twitter posts, and/or desktop notification mediums. Moreover, the platform 122 may help a user understand different degrees of importance or significance assigned to different hot topics ensuring that hot topics of high importance are addressed more quickly. Such messaging may include details of the hot topic as well as context (such as caption data appended to or associated with the hot topic). In this manner, embodiments allow teams of people working on a publication to quickly and accurately address hot topics of interest to their content consumers and audience.

Figure 3C:
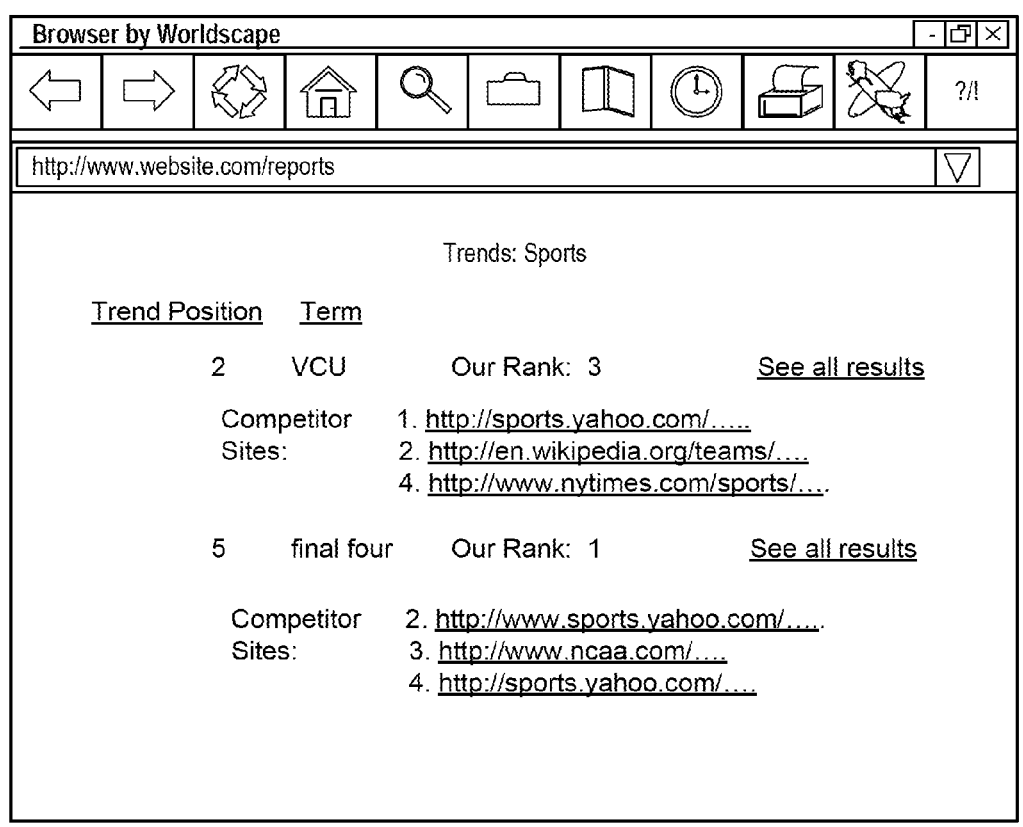

Users operating user devices 130 may also be presented with user interfaces such as that shown in FIG. 3C, where a user interface 320 is shown with data identifying trending terms as well as information about how a specific property ranks for each trending term as compared to one or more competitor sites. By providing such analytic or comparison data, a user operating a user device 130 may identify certain trending terms that require additional attention (e.g., such as the creation of additional content).

According to some embodiments, the data aggregation platform 120, data sources 110, 112, 114, 116 and user device 130 facilitate an automated transfer of information associated hot topics identified by the data aggregation platform 120, allowing users to be presented with information such as alerts about trending topics, instructions for writing content about hot topics, graphs and charts depicting the trending of the hot topics, etc. As used herein the term "automated" indicates that at least some part of a step associated with a process or service is performed with little or no human intervention. By way of examples only, the user devices 130 might be associated with a Personal Computer (PC), a notebook computer, a server, an Internet data "cloud", a workstation, and/or a Personal Digital Assistant (PDA). The data aggregation platform 120 might be associated with, for example, a server, an enterprise application, and/or one or more databases.

Any of the devices described in connection with the system 100 might, according to some embodiments, exchange information via a communication network and use specific communication network protocols. As used herein, devices (including those associated with the data aggregation platform 120, data sources 110-116, user reporting platform 122, content base 124, white list 126, data storage 128 and user devices 130) may exchange information via any communication network, such as a Local Area Network (LAN), a Metropolitan Area Network (MAN), a Wide Area Network (WAN), a proprietary network, a Public Switched Telephone Network (PSTN), a Wireless Application Protocol (WAP) network, an Ethernet network, a wireless LAN network, a mobile/cellular network (GSM, GPRS, EDGE, etc), a WiMAX network, a satellite network (e.g., CDMA, FDMA, etc), and/or an Internet Protocol (TCP/IP) network such as the Internet, an intranet, an extranet. Note that any devices described herein may communicate via one or more such communication networks.

The devices of FIG. 1 might, according to some embodiments, be accessible via a Graphical User Interface (GUI). The GUI might be associated with a data exchange layer application and may be used, for example, to dynamically display and receive information in connection with external or internal data sources and/or a configuration of the data aggregation platform 120, and/or the user device 130.

Although a single data aggregation platform 120 and user device 130 are shown in FIG. 1, any number of such devices and systems may be included. Moreover, various devices described herein might be combined or co-located according to embodiments of the present invention.

The data aggregation platform 120 may include a communication device (e.g., a port) to receive data from the plurality of data sources 110-116 and/or the user device 130. The data aggregation platform 120 may further include a processor coupled to the communication device and a storage device in communication with the processor storing instructions adapted to be executed by the processor to perform a method in accordance with any of the embodiments described herein. For example, the data aggregation platform 120 may aggregate and/or store information that is received from the data sources 110-116. The data aggregation platform 120, and/or the user interface/reporting platform 122 may also receive user selections from the user device 130 (e.g., including updates to white list data, selections of specific hot topics, instructions on establishing alerts or emails of hot topic data, etc.) and transmit display data to the user device 130.

Figure 2:
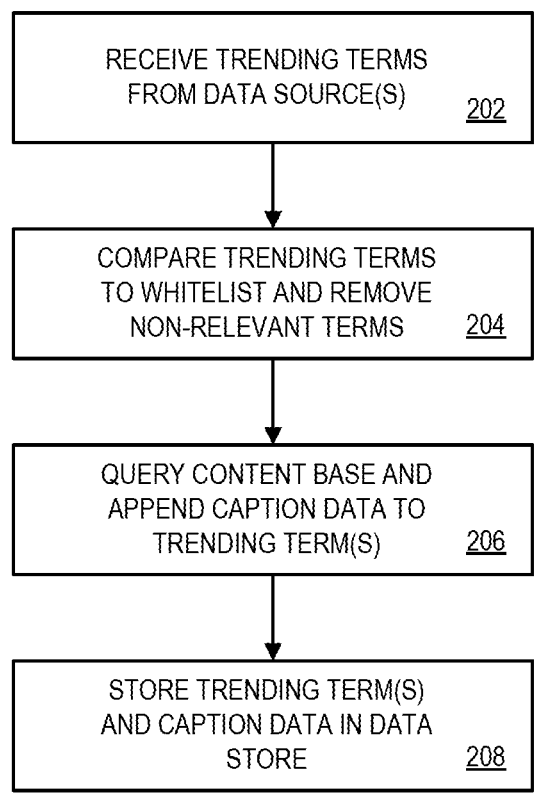
FIG. 2 illustrates a method according to some embodiments of the present invention.

FIG. 2 illustrates one method that might be performed, for example, by the data aggregation platform 120 described with respect to FIG. 1 according to some embodiments. The flow charts and processes described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At 202, data may be received from one or more data sources, the received data being associated with search terms or queries which are "trending" or which have been identified as having an increase in query frequency. For example, the data aggregation platform 120 (of FIG. 1) may receive query or search data from sources such as Google, Facebook, Twitter, or the like. The query or search data may include terms or queries which are seen as having an increase in frequency. For example, data from Twitter may include data from the Twitter API which indicates one or more terms that users are including in their Twitter messages. As an illustrative example, during the 2011 NCAA basketball tournament, there may be an increase in the number or velocity of Twitter messages including the term "Butler" or "VCU". This data may be received by the data aggregation platform 120 at step 202. Note that other types of information may also be received, such as information identifying the number of queries or terms, information associated with a source of each item (e.g., such as a URL or reference), context information (such as, for example, the full Twitter message, or the full search term in the case of information received from a search engine, etc) or the like. The received data might be associated with formal news sources and publications, social media sites, search engine queries, social network posts, social network updates, blog entries, user comments, links, or user connections (e.g., Facebook® "friends").

At 204, the received data may be compared to a white list which includes terms or concepts that are considered relevant to the entity operating the system of the present invention. For example, if the entity operating the system of the present invention is a sports news publication, the white list data may include terms and concepts relating to sports. Processing at 204 includes filtering out terms or data which are not considered relevant for the purposes of the entity operating the system. As a specific illustrative example, where the entity is a sports news publication, the white list may filter out some fashion related terms (such as "Armani" or "Banana Republic"), while other fashion related terms that are possibly related to sports may be retained (such as "Nike" or "Under Armor"). Processing at 204 may include other techniques to ensure that non-relevant terms are filtered out from further processing. Processing at 204 may further include storing information associated with the trending terms in a database (such as data store 128 of FIG. 1). In some embodiments, the white list may be at least partially constructed from tags or data associated with a content base (such as the content base 124 of FIG. 1). For example, when articles or news items are published by a content publisher, tags or terms associated with the article or news item may be specified by a writer or programmatically identified to allow categorization and searching of the article or news item. Those tags or terms may be added to the white list, allowing the creation and maintenance of an up-to-date listing of terms associated with a publication.

Processing continues at 206 where the system 120 continues to process those terms that are considered relevant by querying a content base (such as the content base 124 of FIG. 1) to append caption data to the trending terms. For example, the content base may be a content database including articles, news stories, or other information published by an entity (such as the entity operating the system 120). As a specific illustrative example, the content database may be a database of stories or information published (or to be published) by a sports news publication. The content base may be or include a content management system (CMS) that stores the news stories and allows them to be viewed over the Internet by readers of the sports news publication. In an illustrative example in which the 2011 NCAA basketball tournament is in process, and a trending term is the term "VCU score", processing at 206 may include querying a content base of current content from a sports news publication database and appending the trending term "VCU score" with a caption from the sports news publication database (such as "VCU Upsets Kansas. Move over Butler, Virginia Commonwealth is crashing the Final Four. VCU stunned the Jayhawks 71-61 on Sunday."). In this manner, embodiments allow trending terms to be given context so that writers, editors, and other publication staff can use the trending terms and context to develop more detailed stories or articles. The result is an ability to quickly identify terms that consumers are searching for information on, provide context, and then create improved or new content that matches consumer demand.

Processing continues at 208 where the system stores the trending terms and associated caption data in a data store (such as data storage device 128). The data may be stored in a manner which allows users (such as writers, editors or other publication staff) to easily view the data and use the data as the basis for creating or updating content. In some embodiments, the data may be stored in a manner which includes information associated with the velocity or scale of the trend. For example, terms which have the greatest demand as measured by the number of queries or instances may be displayed most prominently. Metrics may also be used to weight or otherwise indicate the relative demand for information. In this manner, writers, editors and other publication staff can make sure that terms having the greatest consumer relevance are given the highest priority. Users (such as writers, editors or other publication staff) may interact with, view and use the data by operating user devices such as devices 130 of FIG. 1. In some embodiments, alerts (via email, RSS or the like) may also be triggered to ensure that users are informed of certain trending terms or the need to prepare and produce content associated with trending terms. For example, a writer assigned to cover a specific topic area may be alerted when a trending term is identified in the topic area.

Figure 4:
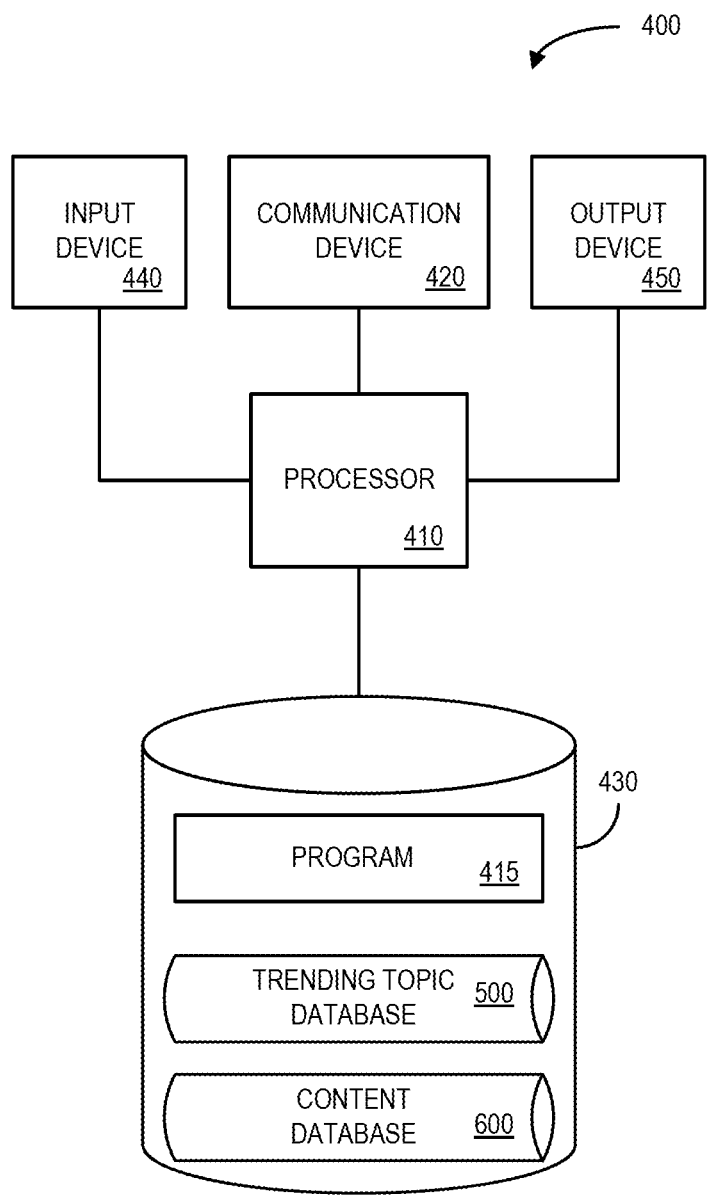
FIG. 4 is a block diagram of an aggregation platform apparatus in accordance with some embodiments of the present invention.

FIG. 4 is a block diagram of a data aggregation platform apparatus 400 in accordance with some embodiments of the present invention. The apparatus 400 might, for example, comprise a platform or engine similar to the aggregation platform 120 illustrated in FIG. 1. The apparatus 400 comprises a processor 410, such as (but in no way limited to) one or more INTEL® Pentium® processors, coupled to a communication device 420 configured to communicate via a communication network (not shown in FIG. 4). The communication device 420 may be used to exchange information with remote data sources (including data sources 110, 112, 114, and 116 of FIG. 1), users (through a user interface/reporting platform 122), white list data (such as item 126 of FIG. 1) and other systems and devices.

The processor 410 is also in communication with an input device 440. The input device 440 may comprise, for example, a keyboard, a mouse, or computer media reader. Such an input device 440 may be used, for example, to enter configuration and/or management information about aggregation platform preferences. For example, a user or administrator may interact with the input device 440 to input, edit or otherwise interact with data such as the white list data used by the aggregation platform 400. The processor 410 is also in communication with an output device 450. The output device 450 may comprise, for example, a display screen or printer. Such an output device 450 may be used, for example, to provide reports and/or display information associated with trending data and information for users such as editors, journalists or other content creators.

The processor 410 is also in communication with a storage device 430. The storage device 430 may comprise any appropriate information storage device, including combinations of magnetic storage devices (e.g., hard disk drives), optical storage devices, and/or semiconductor memory devices such as Random Access Memory (RAM) devices and Read Only Memory (ROM) devices. The storage device 430 stores a program 415 for controlling the processor 410. The processor 410 performs instructions of the program 415, and thereby operates in accordance any embodiments of the present invention described herein. For example, the processor 410 may aggregate and/or store information that is received from data sources about trending keywords or topics.

As used herein, information may be "received" by or "transmitted" to, for example: (i) the visualization platform apparatus 400 from other devices; or (ii) a software application or module within the data aggregation platform apparatus 400 from another software application, module, or any other source.

As shown in FIG. 4, the storage device 430 also stores the trending topic database 500. One example of such a database 500 that may be used in connection with the aggregation platform apparatus 400 will now be described in detail with respect to FIG. 5. The illustration and accompanying descriptions of the database presented herein are exemplary, and any number of other database arrangements could be employed besides those suggested by the figures. For example, different databases associated with different types of trending topic data might be stored at (or accessible to) the apparatus 400.

FIG. 5 is a tabular view of a portion of the trending topic database 500 in accordance with some embodiments of the present invention. The table includes entries associated with individual trending topic keywords or other terms (otherwise referred to herein as "hot topics"). The table also defines fields 502, 504 and 506 for each of the entries. The fields specify: a trending topic 502, a caption 504 (e.g., from a content database such as database 600), a matching story identifier 506 (e.g., such as a URL to a story). The information in the database 500 may be periodically created and updated based on information received from different trending topic databases or data sources and/or user devices. For example, referring to FIG. 1, the data in database 500 may be inserted or updated into the database 500 based on information received from data sources 110-116 on a real time or other regular basis. As a trending topic 502 is received (along with a matching story URL 506), the topic is used to search a content database 600 (described below) to find some context for the topic. This context is added as the field shown as site caption 504.

For example, in the example data shown in FIG. 5, one of the trending topics is "Johnny Damon", and the site caption associated with the topic is "The Red Sox would have liked to add Johnny Damon, but they'll carry on." The context or site caption is based on content published by a publisher operating the system of the present invention, and is used to ensure that new trending topics are associated with some current context. For example, during the course of a baseball season, there may be dozens if not hundreds of stories or topics that relate to Johnny Damon. However, at a point in time when the term "Johnny Damon" is a hot topic or trending term, it is likely that users are searching for a specific event or news item associated with Mr. Damon. By matching a trending topic with some context (such as the most recent story published by the entity operating the system of the present invention), embodiments allow additional stories or news items to be generated by a writer who has some context or information about why the term may be trending. Further context is provided by providing a matching story 506 associated with the trending topic. The trending topic database 500, as a result, can be used to trigger alerts, or messages to editorial staff to ensure that the trending topic is appropriately covered, and that the staff knows that the reason why the term "Johnny Damon" is a hot topic is that it relates to a story about him not rejoining the Red Sox. The editorial staff will also be alerted that content consumers are very interested in this topic, as they are searching for the term "Johnny Damon" on a frequent basis.

Figure 6:
FIG. 6 is a tabular view of a portion of a content database in accordance with some embodiments of the present invention.

FIG. 6 is a tabular view of a portion of the content database 600 in accordance with some embodiments of the present invention. The table includes entries associated with individual stories or topics which have been written or published by an entity operating the system of the present invention. For example, the content database 600 may be, or be associated with, a content management system which stores content such as articles, news items, or the like for display or other use in conjunction with one or more Websites. The table also defines fields 602, 604 and 606 for each of the entries. The fields specify: a title 602, an excerpt 604 (e.g., such as an introduction, a snippet, or an overview paragraph associated with a story, article, news item or other item of content), and a URL 606 or other identifier indicating where, on a Website or other property, the article associated with the story may be accessed or viewed.

The information in the database 600 may be periodically created and updated based on information received from one or more Websites, publications or other properties associated with an entity operating the system of the present invention. For example, the data in the database 600 may be or include data from a Website operated by news publication or other publisher. In some embodiments, the content database may include a number of additional fields (not shown) which specify further details of each story or item in the database, such as, for example, keywords, tags, dates, or the like. As described above, the data in the content database 600 is used, in some embodiments, to provide additional context to hot topics identified pursuant to the present invention.

As a result of the embodiments described herein, a broad capability to interface, acquire, mine, and identify "hot topics" or trending search terms or query is provided. The platforms and systems described herein may allow a publisher or other entity to automatically identify hot or trending topics, search terms or queries, append some context to those topics, and identify which trending topics are of interest to the audience associated with the publisher or entity.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the databases and apparatus described herein may be split, combined, and/or handled by external systems).

Applicants have discovered that embodiments described herein may be particularly useful in connection with search engine, social networking, and other data sources, although embodiments may be used in connection other types of information.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed:

1. A data aggregation apparatus, comprising:
    a communication device to receive social media data from a plurality of remote data sources, the received social media data being associated with a plurality of topics;
    a processor coupled to the communication device; and
    a storage device in communication with the processor and storing instructions configured to be executed by the processor to:
    analyze the received social media data to identify a trending hot topic, the trending hot topic being at least one of a topic rising in citations and a topic rising in use;
    compare the trending hot topic with a database of topical terms, the database of topical terms including terms relevant to a predetermined topic associated with a particular topic of interest;
    determine that the trending hot topic is relevant to the predetermined topic;
    query a content database using the trending hot topic to identify a caption to be associated with the trending hot topic;
    append the caption to the trending hot topic, the appended caption providing an indication of context for the trending hot topic; and
    store the trending hot topic and the caption in a database, wherein topical terms in the database of topical terms are derived from data in the content database.

2. The apparatus of claim 1, wherein the indication of context provided by the appended caption is an indication of why the trending hot topic is rising in citations or rising in use.

3. The apparatus of claim 1, wherein the trending hot topic is a topic identified as being commented on with at least one of a frequency and a velocity that is higher than normal.

4. The apparatus of claim 1, wherein at least a portion of the terms is identified using tags associated with content created on the predetermined topic, the content stored in the content database in communication with the apparatus.

5. The apparatus of claim 1, further comprising instructions configured to be executed by the processor to transmit a notification of the trending hot topic and the caption to a user device in communication with the apparatus.

6. The apparatus of claim 1, wherein the instructions adapted configured to be executed by the processor to query the content database include instructions adapted configured to be executed by the processor to query a content management system.

7. The apparatus of claim 1, wherein the appended caption includes at least one of a keyword, a tag, a date, a title, an excerpt from an article, an article, and a description associated with content stored in the content database.

8. The apparatus of claim 1, wherein the content database includes content published by a selected group of publishing entities.

9. The apparatus of claim 1, wherein the content database includes content published by a single publishing entity.

10. A computer-implemented method, comprising:
    receiving social media data from a plurality of remote data sources, the received social media data being associated with a plurality of topics;
    analyzing the received social media data to identify a trending hot topic, the trending hot topic being at least one of a topic rising in citations and a topic rising in use;
    comparing the trending hot topic with a database of topical terms, the database of topical terms including terms relevant to a predetermined topic associated with a particular topic of interest and wherein the topical terms in the database of topical terms are derived from data in a content database;
    determining that the trending hot topic is relevant to the predetermined topic;
    querying the content database using the trending hot topic to identify a caption to be associated with the trending hot topic;
    appending the caption to the trending hot topic, the appended caption providing an indication of context for the trending hot topic; and
    storing the trending hot topic and the caption in a database.

11. The computer-implemented method of claim 10, wherein the indication of context provided by the appended caption is an indication of why the trending hot topic is rising in citations or rising in use.

12. The computer-implemented method of claim 10, wherein at least a portion of the terms is identified using tags associated with content created on the predetermined topic, the content stored in the content database.

13. The computer-implemented method of claim 10, further comprising:
    transmitting a notification of the trending hot topic and the caption to a user device.

14. The computer-implemented method of claim 10, wherein the content database is a content management system.

15. The computer-implemented method of claim 10, wherein the appended caption includes at least one of a keyword, a tag, a date, a title, an excerpt from an article, an article, and a description associated with content stored in the content database.

16. The computer-implemented method of claim 10, wherein the content database includes content published by a selected group of publishing entities.

17. The computer-implemented method of claim 10, wherein the content database includes content published by a single publishing entity.

18. A non-transitory computer-readable medium storing instructions configured to be executed by a processor, the medium comprising:
   instructions to receive social media data from a plurality of remote data sources, the received social media data being associated with a plurality of topics;
   instructions to analyze the received social media data to identify a trending hot topic, the trending hot topic being at least one of a topic rising in citations and a topic rising in use;
   instructions to compare the trending hot topic with a database of topical terms including terms relevant to a predetermined topic associated with a particular topic of interest and wherein the topical terms in the database of topical terms are derived from data in a content database;
   instructions to determine that the trending hot topic is relevant to the predetermined topic;
   instructions to query the content database using the trending hot topic to identify a caption to be associated with the trending hot topic;
   instructions to append the caption to the trending hot topic, the appended caption providing an indication of context for the trending hot topic; and
   instructions to store the trending hot topic and the caption in a database.

19. The medium of claim 18, wherein the trending hot topic is a topic identified as being commented on with at least one of a frequency and a velocity that is higher than normal.

20. The medium of claim 18, wherein the caption is retrieved from a database of existing content associated with the trending hot topic.

21. The medium of claim 18, wherein the appended caption includes at least one of a keyword, a tag, a date, a title, an excerpt from an article, an article, and a description associated with content stored in the content database.

22. The medium of claim 18, wherein the content database includes content published by a selected group of publishing entities.

23. The medium of claim 18, wherein the content database includes content published by a single publishing entity.

\* \* \* \* \*